United States Patent
Liggitt et al.

(10) Patent No.: US 10,318,318 B2
(45) Date of Patent: Jun. 11, 2019

(54) EXTENDING USER INTERFACE OF A WEB CONSOLE

(71) Applicant: Red Hat, Inc., Raleigh, NC (US)

(72) Inventors: Jordan Thomas Liggitt, Fuquay-Varina, NC (US); Jessica Whitley Forrester, Raleigh, NC (US); Benjamin Petersen, Raleigh, NC (US); Samuel George Padgett, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 70 days.

(21) Appl. No.: 15/054,688

(22) Filed: Feb. 26, 2016

(65) Prior Publication Data

US 2017/0249177 A1 Aug. 31, 2017

(51) Int. Cl.
| | |
|---|---|
| *G06F 9/451* | (2018.01) |
| *G06F 9/455* | (2018.01) |
| *H04L 29/08* | (2006.01) |
| *G06F 8/38* | (2018.01) |

(52) U.S. Cl.
CPC ............ *G06F 9/451* (2018.02); *G06F 8/38* (2013.01); *G06F 9/45558* (2013.01); *H04L 67/34* (2013.01); *G06F 2009/4557* (2013.01)

(58) Field of Classification Search
CPC .......... G06F 9/45558; G06F 9/4443; G06F 2009/4557; G06F 2009/45562; G06F 8/60; G06F 9/451; G06F 8/38; H04L 67/34
See application file for complete search history.

(56) References Cited

U.S. PATENT DOCUMENTS

| | | | |
|---|---|---|---|
| 6,654,947 B1 | 11/2003 | North et al. | |
| 7,401,131 B2* | 7/2008 | Robertson | G06Q 10/10 707/999.01 |
| 7,689,665 B2 | 3/2010 | Lipton et al. | |
| 7,810,105 B2 | 10/2010 | Prabandham et al. | |
| 8,407,584 B1 | 3/2013 | Boodman et al. | |
| 8,799,771 B2 | 8/2014 | Bourke et al. | |
| 8,978,035 B2 | 3/2015 | McGrath et al. | |
| 9,032,506 B2 | 5/2015 | Parla et al. | |

(Continued)

OTHER PUBLICATIONS

"Custom output in the Web Console", mozilla.org, Aug. 28, 2014, 21 pages https://developer.mozilla.org/en-US/docs/Tools/Web_Console/Custom_output.

(Continued)

*Primary Examiner* — Jacob D Dascomb
(74) *Attorney, Agent, or Firm* — Lowenstein Sandler LLP (57) ABSTRACT

A method relates to launching, by a processing device executing a virtual machine deployment application, an asset server communicatively coupled to a data storage, launching a container comprising a file server that stores configuration data associated with a web console, wherein the web console provide a user interface to access the virtual machine deployment application, recording, in a configuration data structure residing in the data storage, a network address associated with the container, retrieving, by the asset server, the configuration data stored in the file server using the network address recorded in the configuration data structure, and providing the configuration data to a cache associated with the web console to modify the user interface.

20 Claims, 6 Drawing Sheets

(56) References Cited

U.S. PATENT DOCUMENTS

| | | | |
|---|---|---|---|
| 9,519,505 B1* | 12/2016 | Murray | G06F 9/50 |
| 2008/0201118 A1 | 8/2008 | Luo | |
| 2008/0301674 A1* | 12/2008 | Faus | G06F 9/45558 |
| | | | 718/1 |
| 2009/0144640 A1* | 6/2009 | Schneider | G06F 17/30905 |
| | | | 715/760 |
| 2011/0119615 A1* | 5/2011 | Cisler | G06F 9/451 |
| | | | 715/772 |
| 2012/0089933 A1* | 4/2012 | Garand | G06F 9/4443 |
| | | | 715/765 |
| 2014/0215312 A1* | 7/2014 | Hicks | G06F 17/30861 |
| | | | 715/235 |
| 2014/0280431 A1 | 9/2014 | Shelest | |

OTHER PUBLICATIONS

"Extensions Overview", apple.com, Dec. 8, 2015, 10 pages https://developer.apple.com/library/safari/documentation/Tools/Conceptual/SafariExtensionGuide/ExtensionsOverview/ExtensionsOverview.html.

* cited by examiner

FIG. 1

```
200
  assetConfig:
    extensionScripts:
      - "/path/to/script1.js"
      - "/path/to/script2.js"
    extensionCSS:
      - "/path/to/stylesheet1.css"
    extensionFiles:
      - location: "/path/to/javascript/files/"
        subcontext: "java"
        html5Mode: true
      - location: "/path/to/stylesheets/files/"
        subcontext: "css"
    extensionProxy:
      jsFile: "https://www.jsproxyserver.com/foo.js"
      cssFile: "https://www.cssproxyserver.com/foo.css"
```

202 → assetConfig
204 → extensionScripts
206 → extensionCSS
208 → extensionFiles (first)
210 → extensionProxy

EXTENDING USER INTERFACE OF A WEB CONSOLE

TECHNICAL FIELD

This disclosure relates to user interface, and in particular, to extending the user interface of a web console associated with a platform such as, for example, a layered platform that provisions virtual machines and containers.

BACKGROUND

The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system, and/or middleware and a framework. Customers that have installed and are executing their programs "in the cloud" typically communicate with the executing program from remote geographic locations using Internet protocols (IP).

BRIEF DESCRIPTION OF THE DRAWINGS

The present disclosure is illustrated by way of example, and not by way of limitation, in the figures of the accompanying drawings.

DETAILED DESCRIPTION

Software developers may use a web interface associated with a layered platform (e.g., OpenShift®) running on a host machine to deploy virtual machines (including the lightweight containers) and composite applications to run on these virtual machines. The layered platform may include a client layer, a master layer, and a node layer. The client layer may be a software application that resides on a client machine, such as a workstation of a software developer, and provides an interface to a user of the client machine to interact with the master layer. The master layer may reside on a host machine (referred to as a master). The master layer may facilitate the creation and deployment on the cloud (via the node layer) of virtual machines and applications. The node layer may include nodes on which the applications are provisioned and executed. A node is a system (e.g., a virtual machine or a physical machine) that provides a run-time environment for multiple instances of a software application including containers. A container is an executable package that combines an application and its runtime environment (e.g., the libraries on which the application depends) so that the application may run as self-contained code (i.e., without depending on the underlying operating system to provide the runtime environment). Thus, a containerized application is lightweight and portable across different runtime environments. The master layer may act as the middleware between the client layer and the node layer.

In some implementations, the client machine may provide a web browser (e.g., Mozilla Firefox®) for the user of the client machine to interact with a web console running as a component of the master layer. The web console is a server software application that provides a user interface (e.g., in the form of web page) to the client machine. A developer can use the web console (via the web browser on the client machine) to visualize, browse, and manage the contents of different projects such as, provisioning containers and removing containers.

The web console is part of the master layer and is typically started with the initiation of the master layer by a processing device of the host machine. For example, the web console may run in conjunction with an application programming interface (API) server of the master layer. The layered platform, when executed, may serve the static assets required to run the web console. The static assets for the web console may include attributes that define the look and feel presented to the web browser of the client machine. In one implementation, an asset server associated with the API server may provide the static assets for the web console, whereas the asset server can reside in the master layer or the node layer. The attributes may be specified as part of the master configuration data stored in the master configuration file associated with the master layer. Some of the attributes may be provided as static, default values, and some of the attributes may be provided dynamically via stylesheets (e.g., Cascading Style Sheets (CSS)) and/or scripts (e.g., JavaScripts).

Figure 1:
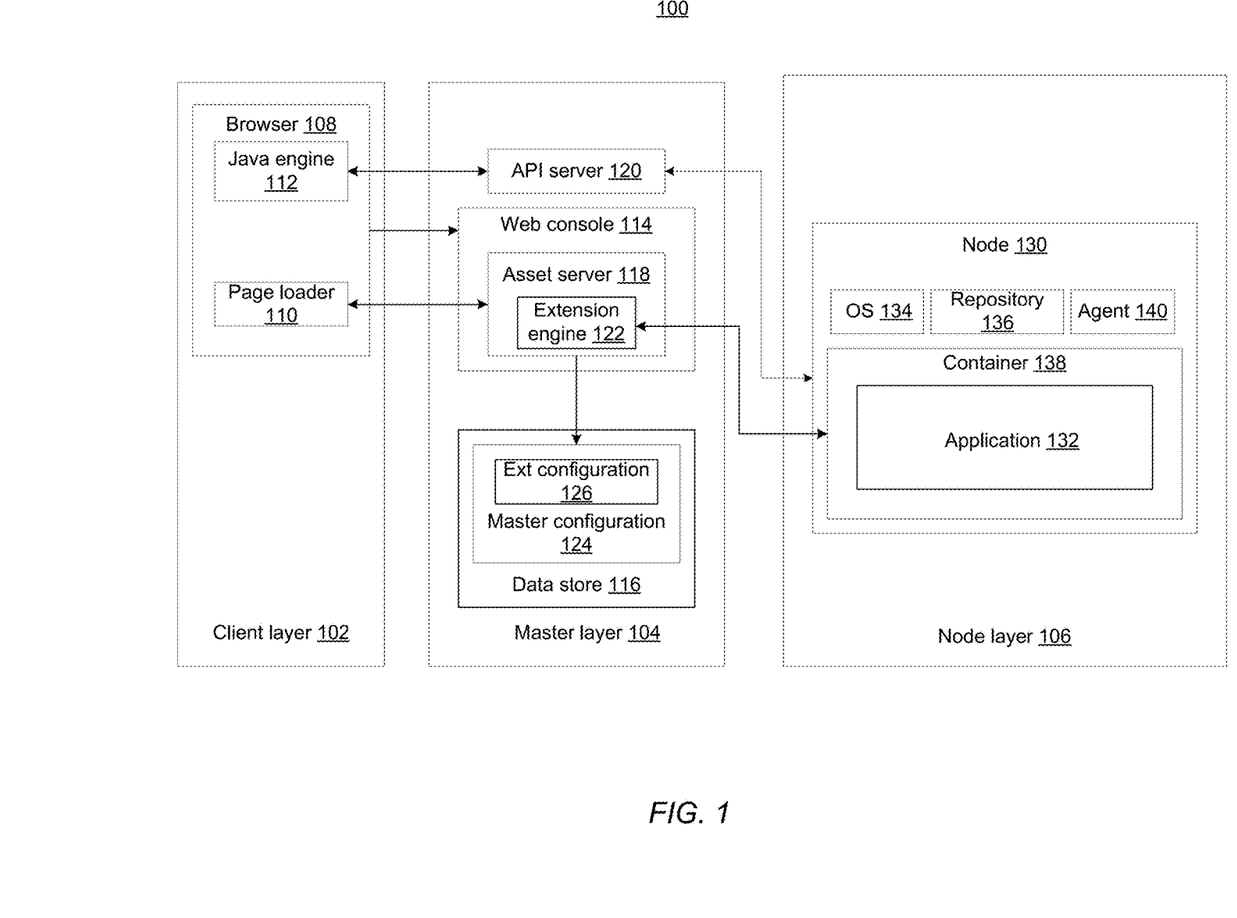
FIG. 1 illustrates a layered platform to provision virtual machines according to an implementation of the present disclosure.

The stylesheets and scripts are defined as the static assets embedded in the executable code (referred to as the binary) of the layered platform via the master configuration data. In some situations, an administrator of the web console may want to modify and/augment the user interface (referred to as user interface extensions) to a user of the client layer in addition to those already defined in the static assets. The user interface extension can be new stylesheets or script functions associated with the user interface. To add the extensions, the administrator needs to create and store stylesheet and script extensions files in file folders and create references to these extensions in the master configuration file. The administrator may then need to rebuild the binary of the layered platform to enable the user to use these user interface extensions as part of the static assets of the layered platform. The technical problem solved by the implementations of the present disclosure is to add user interface extensions without rebuilding the binary of the layered platform FIG. 1 illustrates a layered platform 100 to provision virtual machines according to an implementation of the present disclosure. A user may use layered platform 100 (e.g., OpenShift) to deploy nodes (e.g., virtual or physical machines) and containers in a cloud, and deploy and execute software applications in these containers. As shown in FIG. 1, layered platform 100 may include a client layer 102, a master layer 104, and a node layer 106. Client layer 102, as discussed above, may be a software application that resides on a client machine and provide an interface (e.g., a web browser) to a user of the client machine to access the master layer 104 of the layered platform 100. In one implementation, client layer 106 may include a browser 108 for accessing a web server (e.g., web console 114 of master layer 104) that may serve web contents (e.g., web pages). Browser 108 may include components of a page loader 110 and a JavaScript engine 112 for loading contents of these web pages and for parsing and executing the content of these web pages. Browser 108 may be directed to web console 114 via a uniform resource locator (URL) address associated with web console 114. In one implementation, page loader 110 may retrieve static assets including HyperText Markup Language (HTML) pages, and CSS stylesheets and JavaScript functions specified in the HTML pages. The parsers and execution engines for interpreting the syntax of these HTML pages, CSS stylesheets, and JavaScript functions are provided in the binary of the layered platform (e.g., OpenShift binary). The static assets such as, the HTML pages, CSS stylesheets, and JavaScript functions may be served by an asset server 118 of master layer 104. The asset server 118 is a software application implemented in master layer 104 (or in the node layer 106) to provide elements (e.g., script functions and stylesheets) of web console 114 to browser 108.

In one implementation, browser 108 may include a JavaScript engine 112 that may be employed to interpret JavaScript functions embedded in web pages served by web console 114. To this end, JavaScript engine 112 may first establish socket connections (e.g., WebSockets) with an API server 120 of master layer 104 to receive a list of resources (e.g., peripheral devices) associated with the client machine. The JavaScript functions embedded in the web pages may process events generated by these resources. JavaScript engine 112 may, in a first pass, parse the syntax of web pages and retrieve definition of functions including JavaScript functions employed in the web pages. JavaScript engine 112 may, in a second pass, monitor events generated at these resources. For example, JavaScript engine 112 may monitor events associated with an input device (e.g., a display element on the screen) on behalf of web console 114. Responsive to detecting the occurrence of an event (e.g., selecting a display element by the mouse), JavaScript engine 112 may send a request to API server 120 for updating certain attributes that have been defined as associated with the event. The update can be as simple as a change of the display attributes of the web page.

Master layer 104, residing on a host machine (not shown), may include a virtual machine deployment software application that has been compiled into binary code suitable for execution on a processing device (e.g., a central processing unit (CPU)) of the host machine. In one implementation, master layer 104 includes software components that coordinate requests from the client layer 102 with actions to be performed at the node layer 106. The components in master layer 104 may include a web console 114, an application programming interface (API) server 120, and a persistent data store 116. Web console 114 may include web server software applications that serve web pages representing a user interface to the client machine. In one implementation, as shown in FIG. 1, web console 114 may include an asset server 118, and the data store 116 may include a hardware storage device to store master configuration data 124 including parameters associated with the master layer 104. Master configuration data 124 is a data structure that may contain information such as, for example, API server version, asset server configuration data, network configuration data, data store configuration data, etc.

Asset server 118 of master layer 104 may provide master configuration data 126 to API server 120. API server 120 is a software application running on the host machine. API server 120 may communicate with the JavaScript engine 112 of browser 108 via socket connections (e.g., WebSockets). API server 120 may also validate and configure data for nodes in node layer 106, whereas a node can be a virtual machine or a physical machine on which containers are launched and applications in the containers are executed.

Data store 116 may store master configuration data 124 that may be accessed by asset server 118 on behalf of web console 114. Additionally, data store 116 may store state information of the master layer 104. For example, a user may enter a command to instruct a processing device to establish a node (e.g., creating a virtual machine) in the node layer, and to store a "build" object in data store 116 indicating the "build" state. A change to the state information in data store 116 may cause API server 120 to evoke a controller server (not shown) to make corresponding change in node layer 106.

Node layer 106 may include one or more nodes 130 that can be physical machines or virtual machines running on physical machines. The physical machines may be separate from the host machine or be part of the host machine. In one implementation, containers 138 may be provisioned on nodes 130. Containers 138 can provide a running environment for applications 132.

In one implementation, a node 130 is implemented as a virtual machine including an operating system 134 that can facilitate the execution of applications 132. In one implementation, nodes 130, instead of running applications directly on virtual machines, provides applications 132 in a container 138. Container 138 is an executable code that combines application 132 and its runtime environment (e.g., the libraries on which the application depends). Each container is launched from an image that holds necessary configuration data representing the runtime environment (e.g., libraries) to run the application. Thus, an image contains a static snapshot of the container's configuration. The image may be stored in a repository 136 associated with nodes 130. Each container may be assigned with a respective portion of the memory as a runtime stack to store its image. Thus, containers running on a same node may run independently using their respective runtime stacks.

In one implementation, applications may be built using a platform image that is a base image for all containers. The platform image defines the runtime environment, packages and utilities necessary for a containerized application to run. Layered platform 100 may launch a container from the platform image. The platform image is read-only (or immutable). A containerized application may be built by adding application images on top of the platform image to create an application layer that contains software dependencies for the containerized application. The containerized applications contain individual runtime stacks, making the resultant containerized applications independent from the host operating system and thus portable across systems.

Each one of nodes 130 may also include a server orchestration system agent 140 to track and collect container information associated with the nodes 130 and to perform management actions on the nodes 130. The server orchestration system agent 140 may operate to send requests, queries, and commands between nodes 130 and the master layer 104. For example, a user may use the user interface provided by web console 114 to send requests to create a container, create an application, perform an action on a container, and manage/remove the container, etc. API server 120 may receive these requests and cause asset server 118 to pull from the necessary parameters from master configuration data 124 and a controller server (not shown) to execute on these requests based on these parameters.

In one implementation, a web console resource file may contain definitions of CSS stylesheets and JavaScript functions used by web console 114. In one implementation, the web console resource file may be part of the master configuration data 124. Functions to input the CSS stylesheets and JavaScript functions in the web console resource file are compiled into the binary code of the layered platform 100 as part of the user interface to browser 108. Under certain situations, a user may want to extend the user interface with additional CSS stylesheets and JavaScript functions with respect to the CSS stylesheets and JavaScript functions already built in the static asset of the layered platform 100. These additional stylesheets and script functions are referred to as extension configuration data. Implementations of the present disclosure allow the user to modify and/or expand the user interface without the need to rebuild the binary code of the layered platform 100.

Implementations of the present disclosure may launch the web console 114 to provide a user interface to a client device associated with client layer 102, and then launch an extension application in an image layer on a node on top of the platform image to extend the user interface. The extension application may then load the additional CSS stylesheets and JavaScript functions (referred to as extensions) from a file server in a container. In this way, the user interface provided by web console 114 may be extended without the need to rebuild the binary code of the layered platform 100.

In one implementation, master configuration data 124 may be expanded to include an extension configuration section 126 that defines different methods to load the user interface extensions. In one implementation, asset server 118 may further include an extension engine 122 that may retrieve extension configuration data 126 and provide the extension configuration data (e.g., extended CSS stylesheets and extended JavaScript functions) to web console 114.

Figure 2:
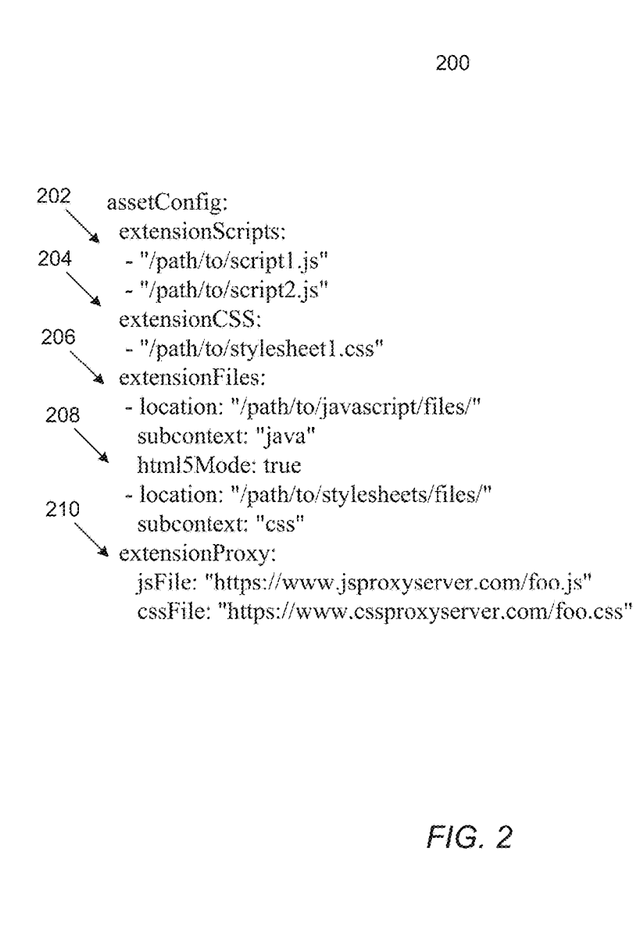
FIG. 2 shows a portion of master configuration data associated with extensions according to an implementation of the present disclosure.

FIG. 2 shows a portion 200 of master configuration data associated with extensions according to an implementation of the present disclosure. In the master configuration data, attributes associated with various extensions may be identified by identifiers within the asset configuration section 202 (identified by "assetConfig"). The asset configuration section 202 may include subsections 204, 206, 208, 210 to specify different communication modes for the extension engine 122 for retrieving extension configuration data. The extension configuration data can be expressively specified in master configuration data 126, provided via a file folder specified in master configuration data 126, and/or provided via a proxy that may be a remote server identified by a uniform resource locator (URL) address or a file server in a container running on a node.

In one implementation, extended CSS stylesheets and JavaScript functions may be stored in file folders accessible by extension engine 122. The locations of these extension configuration data may be expressively set in master configuration data 126 (e.g., by editing the master configuration data by a user). As shown in FIG. 2, for example, a JavaScript extension identifier 204 ("extensionScripts") may be used to identify a subsection of asset configuration section, where the extensionScripts subsection includes a list of JavaScript function locations (e.g., "/path/to/script1.js" and "/path/to/script2.js"). Similarly, a CSS stylesheet extension identifier 206 ("extensionCSS") may be used to identify a subsection that includes a list of CSS stylesheet extension files (e.g., "/path/to/stylesheet1.css"). The locations of extension configuration data may be absolute from a root of a file system in data store 116 or relative with respective to a certain mounting point in the file system. In one implementation, responsive to starting the layered platform 100, extension engine 122 may access the master configuration data 126 to retrieve configuration data including the extension configuration data files and provide web console 114 as a user interface including these new extensions. In another implementation, extension engine 122 may be implemented as a background process that checks the asset configuration data periodically to determine whether new extensions have been added to master configuration data 126 (e.g., as shown in FIG. 2). Responsive to detecting new extensions in master configuration data 126, extension engine 122 may provide web console 114 as a user interface in accordance with these new extensions.

In one implementation, an extension file folder may contain extension configuration data items. Each extension configuration data item may contain extension configuration data associated with a respective attribute to be added to the user interface. For example, each extension configuration data item may be stored in one file in the extension file folder. Correspondingly, in master configuration data 124, the assetConfig section may include a subsection identified by an extension file folder identifier 208 (e.g., "extensionFiles"). Within the subsection identified by "extensionFiles," additional identifiers may be used to identify the paths to extension file folders and context associated with these folders. For example, as shown in FIG. 2, file folder at "/path/to/javascript//files/" may be identified by the subcontext identifier as "java" and associated with an html5Mode flag set to "true" indicating that HTML5 mode is enabled. File folder at "/path/to/stylesheets/files/" may be identified by the subcontext identifier "css" as folder for CSS stylesheet extensions. In one implementation, extension engine 122 may scan, according to a schedule (e.g., periodically), these file folders identified in master configuration data to detect new extension files added to these file folders. The extension files may be JavaScript functions or CSS stylesheets added by an administrator of the layered platform 100. Extension engine 122 may monitor additions of new extension configuration data in the file folders. Responsive to detecting new extension configuration data having been added to these folders, extension engine 122 may provide web console 114 as a user interface in accordance with these new extensions.

In one implementation, the extension configuration data files may be provided via a proxy server to the extension engine 122. In one implementation, the proxy server may be an HTTP server that may remotely serve JavaScript functions and CSS stylesheets to extension engine 122. The URL of the HTTP server may be specified in a subsection of asset configuration. For example, as shown in FIG. 2, a proxy server identifier 210 ("extensionProxy") may identify a subsection that includes the URLs to retrieve JavaScript functions and CSS stylesheets. A JavaScript function file (e.g., foo.js) may be retrieved from a JavaScript proxy server: https://www.jsproxyserver.com, and a CSS stylesheet (e.g., foo.css) may be retrieve from a CSS stylesheet proxy server: https://www.cssproxyserver.com. Thus, extension engine 122 may provide web console 114 as a user interface in accordance with these new extensions retrieved from proxy servers.

Figure 3A:
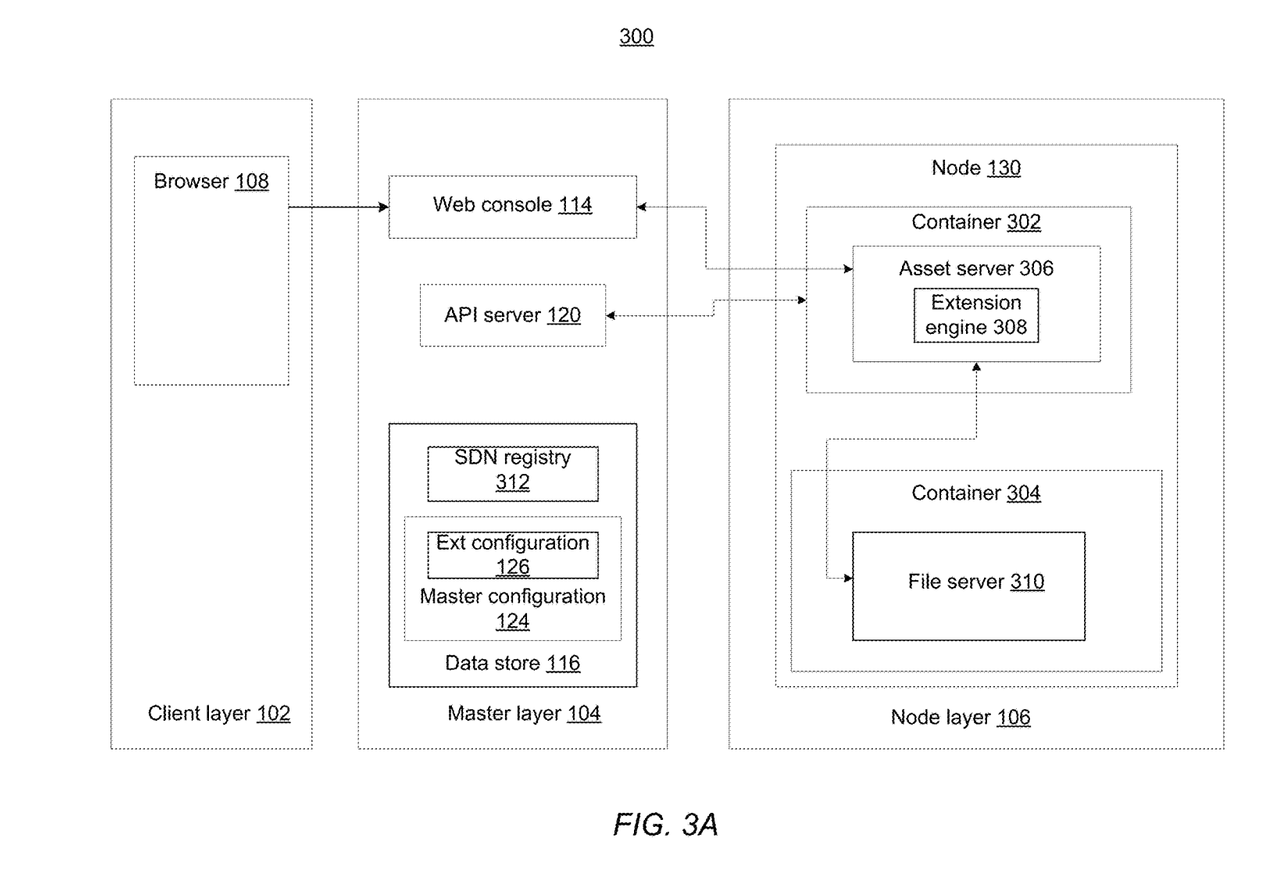
FIGS. 3A-3B illustrate layered platforms according to other implementations of the present disclosure.

In one implementation, instead of running the asset server as part of the master layer 104, the asset server may be initiated in the node layer 106 and run as an application in a container. The extension files are then served from a file server application within the container. FIG. 3A illustrates a layered system 300 according to another implementation of the present disclosure. As shown in FIG. 3A, node layer 106 may include node 130 that provides containers 302, 304. In an alternative implementation (not shown), containers 302, 304 may run on two separate nodes. An asset server 306 may run on the first container 302 and perform functions similar to those of the asset server 118 as described in conjunction with FIG. 1. Asset server 306 may include an extension engine 308 that may perform functions similar to those of the extension engine 122 as described in conjunction with FIG. 1. A file server 310 may run within second container 304 to serve extension files to the extension engine 308. In one implementation, container 304 and file server 310 may be launched as a separate image layer on top of the platform image from which containers 302, 304 are launched. Thus, extension files may be provided to extension engine 308 without modifying the image of container 302.

In one implementation, containers 302, 304 may establish data communication channels via a software-defined networking (SDN) architecture provided in the layered platform 300. The SDN architecture may connect all containers across all nodes in a unified cluster network. In one implementation, master layer 104 may include a SDN registry 312 stored in data store 116. SDN registry 312 may contain a record of the hierarchical structure of nodes and containers in node layer 106. A user (e.g., a system administrator) may register node 130 by assigning a subnet of the cluster network to the node. For example, the cluster network may be 10.1.0.0/6 class B network, and nodes are allocated with /24 subnet (i.e., 10.1.0.0/24, 10.1.1.0/24, 10.1.2.0/24, and so on). For a given node, there are a fixed number (e.g., 254) of addresses that can be assigned to containers running on the node. Thus, each container may be uniquely identified by its address within the clustered network and registered at SDN registry 312.

In one implementation, container 304 and file server 310 contained therein may be launched responsive to launching container 302 and asset server 306 including extension engine 308 contained therein. The SDN network address of file server may be registered in SDN registry 312 and stored in master configuration data 124. In another implementation, a user may use the user interface provided by web console 114 to launch container 304 and file server 310 contained therein. The user may also register SDN network address of container 310 in SDN registry 312. The registration of the SDN network address of container 310 may cause the recordation of SND network address in master configuration data 124.

The master configuration data 124 may include an identifier to identify container 304 as the proxy server to provide the extension files. For example, in the asset configuration section under identifier "extensionProxy," the SDN network address of container 304 may substitute the URL of an external proxy server. If the SND network address is, for example, /10.1.0.0/24/254, a line such as. jsFile: /10.1.0.0/24/254/foo.js, may identify file server 310 running in container 304 as the proxy to provide the JavaScript function, and cssFile: /10.1.0.0/24/254/foo.css, may identify file server 310 running in container 304 as the proxy to provide the CSS stylesheet. Thus, a communication channel may be established between the asset server 306 and file server 304. The communication channel is be used to transmit extension configuration data from file server 310 to asset server 306. The extension configuration data provided by file server 310 may be provided as part of the container image associated with container 304. Thus, layered platform 100 may be used to deploy and update the extension using a file server hosted on the platform rather than via a remote server.

In one implementation, an SDN network address may be attached to a label which an alphanumerical string that may be used as a name to the address. These labels may be assigned by a system administrator of layered platform 100. Thus, a container may be referenced through its label in the master configuration data 126. For example, if SDN network address "/10.1.0.0/24/254" is labeled as "proxy-container," the identifier "extensionProxy" may identify jsFile: /proxy-container/foo.js and cssFile: proxy-container/foo.css.

In one implementation, extension engine 122 may use one or more of the communication modes described above to retrieve the extension configuration data into a memory associated with a processing device of the host machine for further processing. In one implementation, extension engine 122 may retrieve extension files according to their types. For example, extension engine 122 may retrieve Javascript files into the memory and concatenate these retrieved Javascript files into a single data object in the memory. Further, extension engine 122 may retrieve CSS stylesheets into the memory and concatenate these CSS stylesheets into another data object in the memory. Extension engine 122 may further minify these concatenated data object by removing all unnecessary characters from these data objects. For example, extension engine 122 may remove white spaces, new line markers, and comments. Extension engine 122 may further calculate hash (e.g., MD5 hash) of the minified, concatenated data objects and use the hash to set HTTP cache headers to facilitate fast content delivery to browsers (e.g., browser 108). Browsers 108 may access these data objects in the cache to employ the expanded user interface.

Figure 3B:
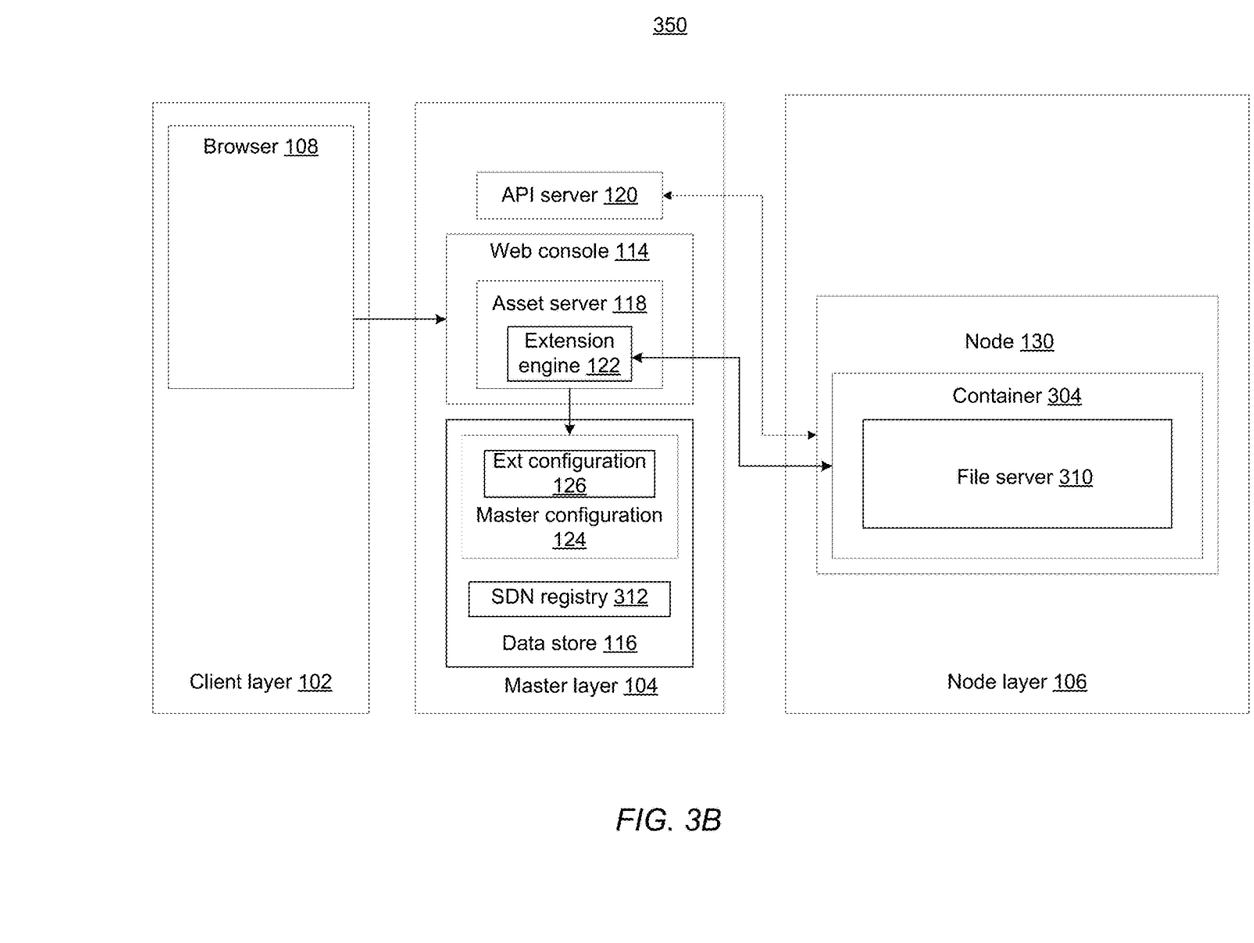

In one implementation, asset server may run on master layer 104 while the file server runs in a container on a node. FIG. 3B illustrates a layered system 350 according to another implementation of the present disclosure. As shown in FIG. 3B, asset server 118 (similar to FIG. 1) runs in master layer 104, and node layer 106 may include a node 130 that provides container 304 in which file server 310 runs as a containerized application. Asset server 118 may include an extension engine 122 to retrieve extension configuration data from file server 310. In one implementation, container 310 and its SND network address may be registered at SDN registry 312 as described above in conjunction with FIG. 3A. The SDN network address for container 304 may then be stored in master configuration data 124 and be identified as a proxy file server to provide the extension configuration data. A communication channel may then be established between extension engine 122 in the master layer 104 and file server 310 for transmitting the extension configuration data. Similarly, the extension configuration data may be concatenated and minified in the memory according to their types and provided to a cache that is accessible by browser 108.

Figure 4:
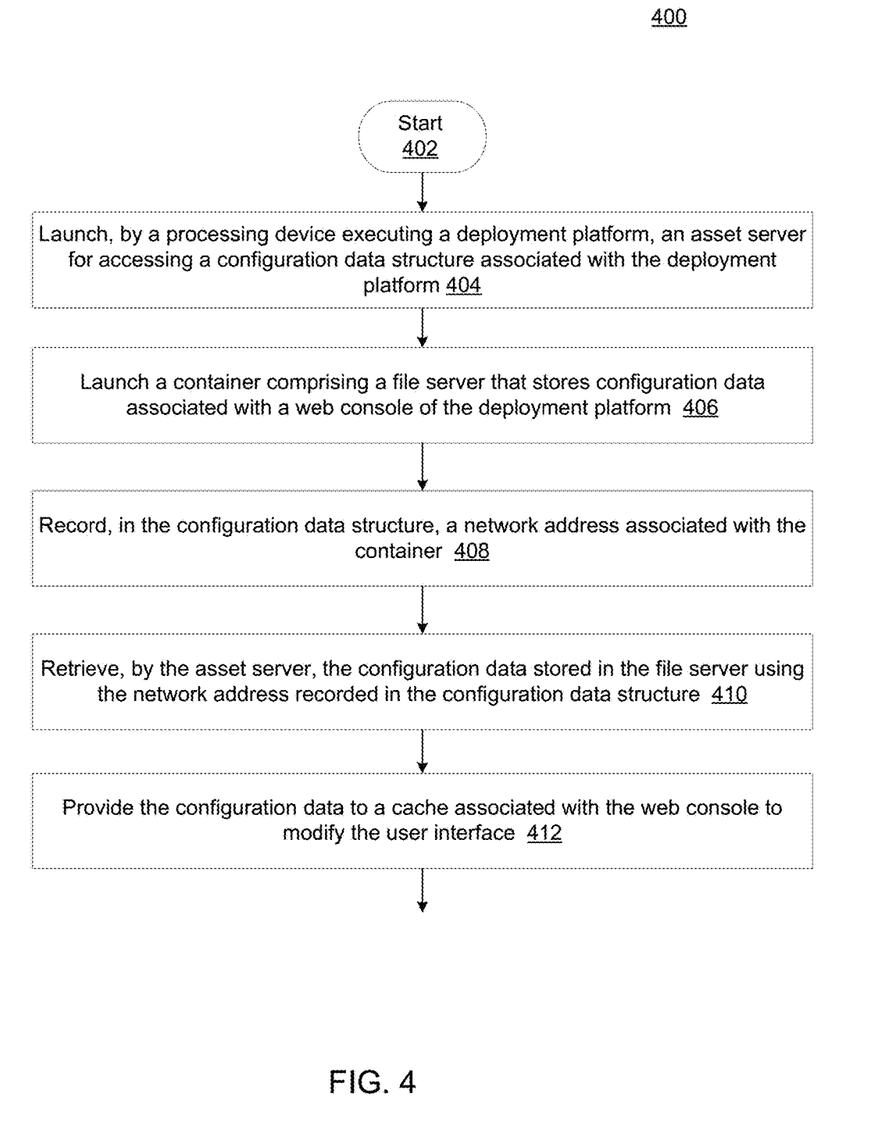
FIG. 4 is a flow diagram illustrating a method to provide user interface extensions to a web console layered platform according to an implementation of the present disclosure.

FIG. 4 is a flow diagram illustrating a method 400 to provide user interface extensions to a layered platform according to an implementation of the present disclosure. The method 400 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. In one implementation, the methods may be performed by a processing device associated with a host machine of master layer 104 as shown in FIGS. 1 and 3.

As shown in FIG. 4, at 402, the processing logic may start a virtual machine deployment application such as, the layered platform 100 as shown in FIG. 1. At 404, the processing logic may launch the deployment platform. Launching the deployment application may include launching an asset server for accessing a configuration data structure (e.g., the master configuration data associated with the master layer as shown in FIGS. 1 and 3). The configuration data structure may have been stored in a data storage associated with the processing device. In one implementation, the asset server may be launched as a containerized application on a node as shown in FIG. 3A. In another implementation, the asset server may be launched as a component of the master layer of the layered platform 100 as shown in FIG. 3B.

At 406, the processing logic may further launch a container containing a file server (serving as a proxy server) that stores extension configuration data associated with a web console of the deployment application. The web console may provide a user interface to a client device (e.g., via a browser of the client device). Each one of the extension configuration data includes an attribute of the user interface. The attribute may modify the user interface.

At 408, the processing logic may record a network address (e.g., SDN network address) of the container containing the file server in the configuration data structure. The network address may be stored in conjunction with a container network address identifier.

At 410, the processing logic may retrieve, by the asset server, the extension configuration data via the file server using the network address recorded in the configuration data structure. The retrieved extension configuration data may be used to set attributes of the web console.

At 412, the processing logic may provide the extension configuration data to modify the user interface. For example, the extension configuration data (e.g., JavaScripts and CSS stylesheets) may be concatenated, minified, and hashed into data objects that are provided to a cache associated with the web console. The browser may have access to the cache to receive the extended user interface.

Although implementations of the present disclosure are described in the context of a layered platform for deploying virtual machines such as, for example, the lightweight containers, implementations of the present disclosure are not limited to virtual machine deployment platforms. Instead, implementations of the present disclosure are applicable to providing user interface extensions to a web console served by any suitable servers such as, for example, and a web server without the need to rebuild the binary code of the web server. Thus, the client layer can be a client machine running a browser, and the master layer can be a web server including a web console to provide a user interface to the client machine.

Figure 5:
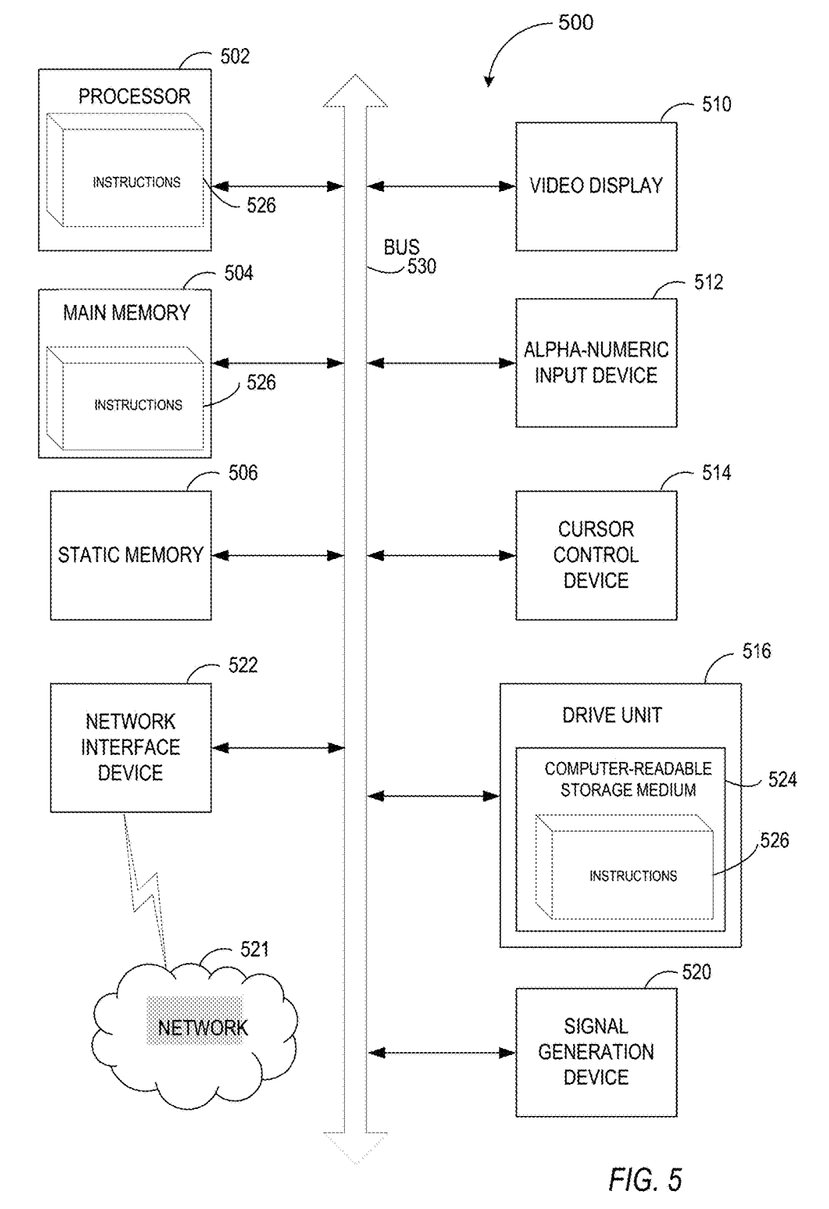
FIG. 5 is a block diagram illustrating an exemplary computer system according to an implementation of the present disclosure.

FIG. 5 illustrates a diagrammatic representation of a machine in the exemplary form of a computer system 500 within which a set of instructions for causing the machine to perform any one or more of the methodologies discussed herein may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD), a cathode ray tube (CRT), or a touch screen), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein (e.g., instructions of the routing application 122). The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 574 via the network interface device 522.

While the computer-readable storage medium 524 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "enabling", "identifying," "selecting," "displaying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    launching, by a processing device executing a virtual machine deployment application, an asset server in a first container, the asset server being communicatively coupled to a data storage;
    launching a second container comprising a file server that stores first user interface configuration data associated with a web console, wherein the web console provides a user interface to access the virtual machine deployment application;
    recording, in a configuration data structure residing in the data storage, a network address associated with the second container;
    retrieving, by the asset server, the first user interface configuration data stored in the file server using the network address recorded in the configuration data structure;
    providing the first user interface configuration data to a cache associated with the web console, wherein the first user interface configuration data specifies an extension configuration file folder;
    monitoring, by a background process which periodically checks user interface extension configuration data, addition of new user interface extension configuration data in the extension configuration file folder;
    responsive to detecting new user interface extension configuration data in the extension configuration file folder, retrieving the new user interface extension configuration data;
    concatenating the first user interface configuration data and the user interface extension configuration data to produce concatenated user interface configuration data;
    calculating a hash value of the concatenated user interface configuration data;
    setting, using the hash value, an HTTP header; and
    transmitting the HTTP header and the concatenated user interface configuration data to a client browser.

2. The method of claim 1, wherein the first user interface configuration data is associated with an attribute of the user interface, and wherein the first user interface configuration data comprises at least one of a JavaScript function or a cascading stylesheet.

3. The method of claim 1, further comprising:
retrieving a second user interface configuration data from the file server;
concatenating, in a memory associated with the processing device, the first user interface configuration data and the second user interface configuration data;
minifying, in the memory, the concatenated user interface configuration data; and
providing the minified user interface configuration data to the cache.

4. The method of claim 1, wherein the asset server is launched in the first container that is separate from the second container.

5. The method of claim 4, wherein the first container and the second container are launched on a first node, and wherein the first node is provided by one of a physical machine or a virtual machine executed on the physical machine.

6. The method of claim 1, wherein the asset server is launched as a component of the virtual machine deployment application on a host machine.

7. The method of claim 1, further comprising:
responsive to recording the network address associated with the container, establishing a communication channel in view of the network address recorded in the configuration data structure; and
retrieving, by the asset server, the first user interface configuration data from the file server via the communication channel.

8. A non-transitory machine-readable storage medium storing instructions which, when executed, cause a processing device to:
launch, by the processing device executing a virtual machine deployment application, an asset server in a first container, the asset server being communicatively coupled to a data storage;
launch a second container comprising a file server that stores first user interface configuration data associated with a web console, wherein the web console provides a user interface to access the virtual machine deployment application;
record, in a configuration data structure residing in the data storage, a network address associated with the second container;
retrieve, by the asset server, the first user interface configuration data stored in the file server using the network address recorded in the configuration data structure;
provide the first user interface configuration data to a cache associated with the web console to modify the user interface, wherein the first user interface configuration data specifies an extension configuration file folder;
monitoring, by a background process which periodically checks user interface extension configuration data, addition of new user interface extension configuration data in the extension configuration file folder;
responsive to detecting new user interface extension configuration data in the extension configuration file folder, retrieve the new user interface extension configuration data;
concatenate the first user interface configuration data and the user interface extension configuration data to produce concatenated user interface configuration data;
calculate a hash value of the concatenated user interface configuration data;
set, using the hash value, an HTTP header; and
transmit the HTTP header and the concatenated user interface configuration data to a client browser.

9. The non-transitory machine-readable storage medium of claim 8, wherein the first user interface configuration data is associated with an attribute of the user interface, and wherein the first user interface configuration data comprises at least one of a JavaScript function or a cascading stylesheet.

10. The non-transitory machine-readable storage medium of claim 8, wherein the processing device is further to:
retrieve a second user interface configuration data from the file server;
concatenate, in a memory associated with the processing device, the first user interface configuration data and the second user interface configuration data;
minify, in the memory, the concatenated user interface configuration data; and
provide the minified user interface configuration data to the cache.

11. The non-transitory machine-readable storage medium of claim 8, wherein the asset server is launched in the first container that is separate from the second container.

12. The non-transitory machine-readable storage medium of claim 11, wherein the first container and the second container are launched on a first node, and wherein the first node is provided by one of a physical machine or a virtual machine executed on the physical machine.

13. The non-transitory machine-readable storage medium of claim 11, wherein the asset server is launched as a component of the virtual machine deployment application on a host machine.

14. The non-transitory machine-readable storage medium of claim 8, wherein the processing device is further to:
responsive to recording the network address associated with the container, establish a communication channel in view of the network address recorded in the configuration data structure; and
retrieve, by the asset server, the first user interface configuration data from the file server via the communication channel.

15. A system comprising:
a memory;
a data storage; and
a processing device, communicatively coupled to the memory and the data storage, executing a virtual machine deployment application, the processing device to:
launch an asset server in a first container, the asset server being communicatively coupled to the data storage;
launch a second container comprising a file server that stores first user interface configuration data associated with a web console, wherein the web console provides a user interface to access the virtual machine deployment application;
record, in a configuration data structure residing in the data storage, a network address associated with the second container;

retrieve, by the asset server, the first user interface configuration data stored in the file server using the network address recorded in the configuration data structure;

provide the first user interface configuration data to a cache associated with the web console to modify the user interface, wherein the first user interface configuration data specifies an extension configuration file folder;

monitor, by a background process which periodically checks user interface extension configuration data, addition of new user interface extension configuration data in the extension configuration file folder;

responsive to detecting new user interface extension configuration data in the extension configuration file folder, retrieve the new user interface extension configuration data;

concatenate the first user interface configuration data and the user interface extension configuration data to produce concatenated user interface configuration data;

calculate a hash value of the concatenated user interface configuration data;

set, using the hash value, an HTTP header; and transmit the HTTP header and the concatenated user interface configuration data to a client browser.

16. The system of claim 15, wherein the first user interface configuration data is associated with an attribute of the user interface, and wherein the first user interface configuration data comprises at least one of a JavaScript function or a cascading stylesheet.

17. The system of claim 15, wherein the processing device is further to:

retrieve a second user interface configuration data from the file server;

concatenate, in the memory associated with the processing device, the first user interface configuration data and the second user interface configuration data;

minify, in the memory, the concatenated user interface configuration data; and provide the minified user interface configuration data to the cache.

18. The system of claim 15, wherein the asset server is launched in the first container that is separate from the second container.

19. The system of claim 18, wherein the first container and the second container are launched on a first node, and wherein the first node is provided by one of a physical machine or a virtual machine executed on the physical machine.

20. The system of claim 15, wherein the asset server is launched as a component of the virtual machine deployment application on a host machine.

* * * * *